June 6, 1933.                    R. B. JONES                    1,912,984
                              INDICATING DEVICE
                          Filed March 18, 1932    2 Sheets-Sheet 1
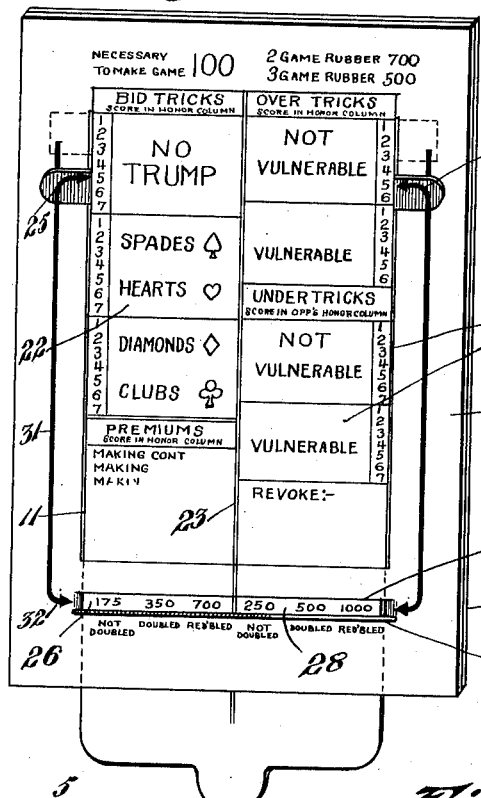
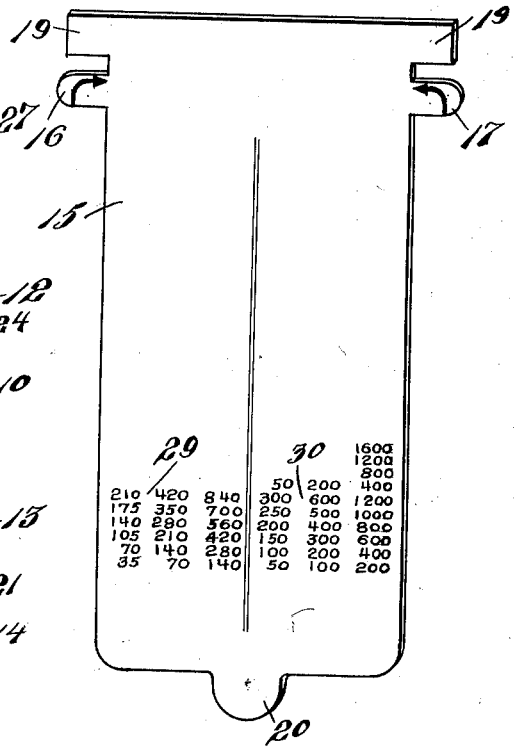
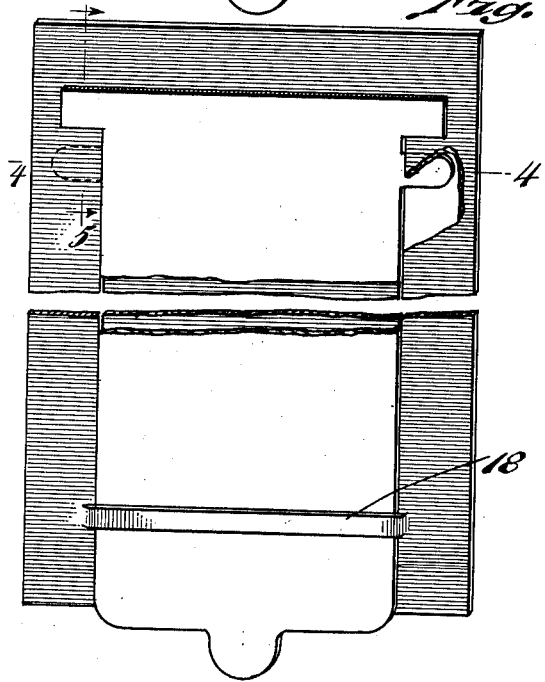
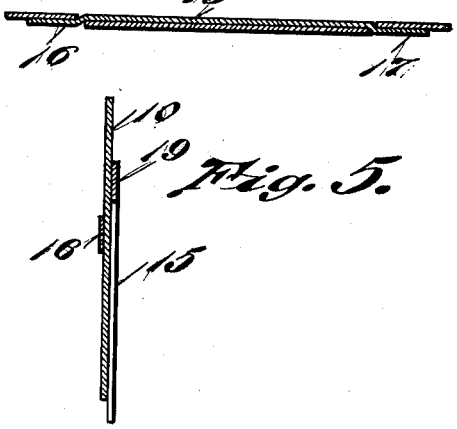
INVENTOR.
Robert B. Jones
BY Barlow & Barlow
ATTORNEYS.

June 6, 1933.  R. B. JONES  1,912,984
INDICATING DEVICE
Filed March 18, 1932  2 Sheets-Sheet 2
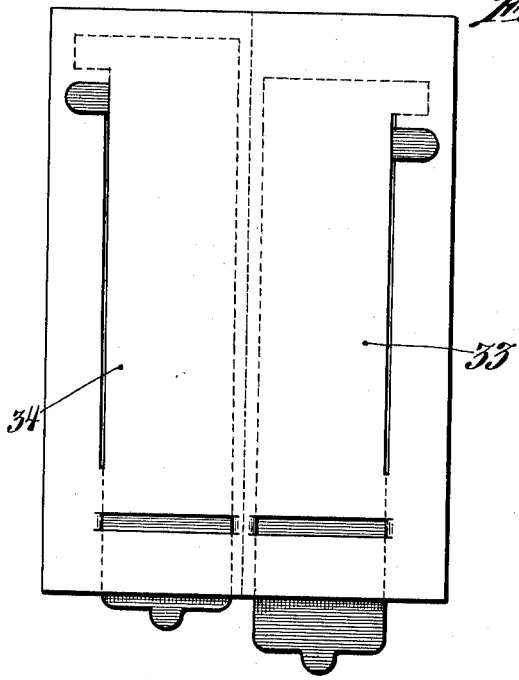
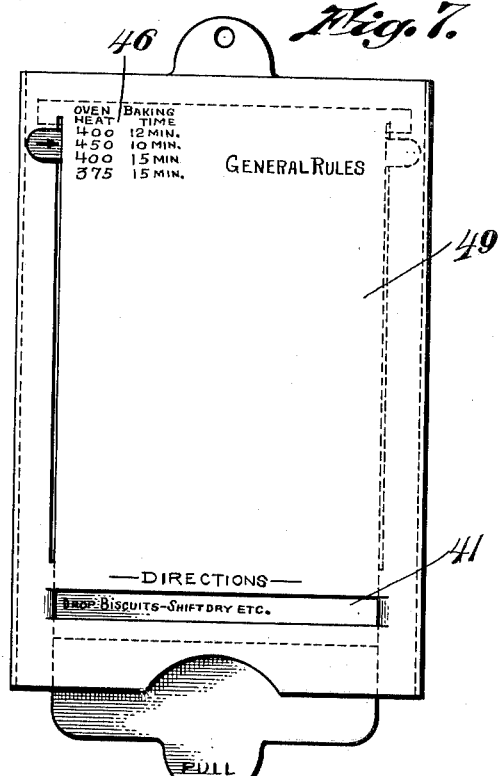
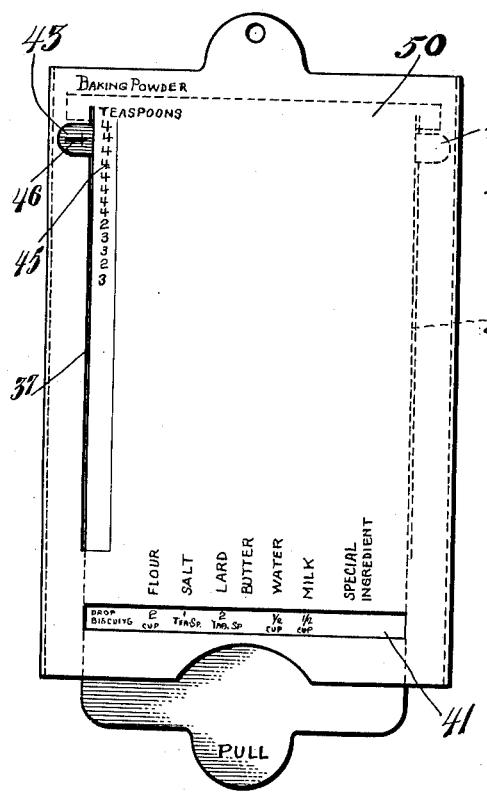
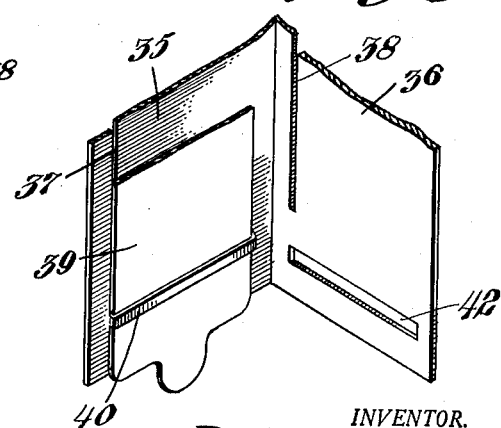
INVENTOR.
Robert B. Jones
BY Barlow & Barlow
ATTORNEYS.

Patented June 6, 1933

1,912,984

UNITED STATES PATENT OFFICE

ROBERT B. JONES, OF PROVIDENCE, RHODE ISLAND

INDICATING DEVICE

Application filed March 18, 1932. Serial No. 599,830.

This invention relates to an indicating device of a statistical type and has for one of its objects to provide two or more relatively moving members with indicia on both of said relatively movable members which will cooperate by means of some indicated connection between them to give to the observer certain desired information.

Another object of the invention is the provision of a construction in which certain known factors may be indicated and other computed or tabulated information resulting from or cooperating with these known factors at once obtained.

A further object of the invention is the provision of indicia of known factors upon the outer of two members with a finger or pointer on the inner member movable to different points on this outer member and with a window opening in the outer member through which cooperating indicia on the inner member may be observed.

With these and other objects in view, the invention consists of certain novel features of construction as will be more fully described and particularly pointed out in the appended claims.

In the accompanying drawings:

Fig. 1 is a perspective view of the indicating device in assembled relation.

Fig. 2 is a perspective view of the inner slidable member.

Fig. 3 is a perspective view with parts broken away to illustrate the relation of the outer and inner relatively slidable members.

Fig. 4 is a sectional view on line 4—4 of Fig. 3.

Fig. 5 is a sectional view on line 5—5 of Fig. 3.

Fig. 6 is a back view of a modified form of construction.

Fig. 7 is a view of one side of a still further modified form of construction.

Fig. 8 is a view of the opposite side of the structure shown in Fig. 7.

Fig. 9 is a perspective view with parts broken away to illustrate the construction of the modification shown in Figs. 7 and 8.

In many different activities, businesses or the like information of a statistical character is desired; for instance, in various recipes in cooking, in the playing of games, such as bridge or contract bridge, certain computations as the result of the play are desired for the purposes of scoring. Also in advertising such as a food product or the like, it is frequently desirable to educate the prospective user of this food product as to its various uses such as receipts for compounding it with various other foods, and in order that such information may be conveniently had, I have provided a construction having relatively movable members with indicia on one of the relatively movable members to which a finger or pointer on the other member may be moved corresponding to some known factor, while computations or factors resulting therefrom or cooperating therewith will appear as the result of this movement at some other definitely indicated position such as through a window in the outer or face member; for the advertising purpose above mentioned the different quantities of the product to be used in the recipe may appear on the outer surface of the outer member and be indicated by a pointer with other varying cooperating ingredients to give certain results appearing in this predetermined position, such as through a window or the like for observation; and the following is a detailed description of the present embodiment of this invention illustrating the preferred means by which these advantageous results may be accomplished.

With reference to the drawings, I have shown a front or outer member 10 which is provided with spaced slots 11 and 12 extending lengthwise thereof, with slits 13 and 14 extending generally at right angles to these slots, and I have also provided an inner member 15 slidable with reference to the member 10 which has fingers 16 and 17 to extend laterally through the slots 11 and 12 to overlie the front or outer surface of the member 10. This member 15 is also woven through the slits 13 and 14 to overlie the portion 18 between these slits so that in effect the space between the slits is a window through which small portions of the member 15 may be observed. The tabs 19 on the upper end of the member 15 lie back of or beneath the member 10 and with the fingers 16 and 17 frictionally grip the marginal edges along the slots 11 and 12 and assist in guiding this end of the member 15 during its movement relative to the member 10. The finger piece 20 at the lower edge of the member 15 serves as a convenient point for gripping the member 15 for relatively moving it.

In Figure 1, I have illustrated a back plate as a part of the outer member which I designate 21. This forms a finish for the back or convenient mount in certain cases, although in this form shown it is not necessary.

One use of the device is that illustrated for the scoring of contract bridge. For instance, I have provided a series of indicia 22 along one side of the dividing line 23 and another series of indicia 24 along the other side thereof. The series of indicia 22 are divided into different bids possible in the game of contract bridge. The bid of "no trump" is in a block by itself as the trick value of no trump is different from that of any of the other bids. Spades and hearts are grouped together in another block as their trick values are the same. Diamonds and clubs are grouped together in another block as their trick values are equal to each other but different from the other two blocks. Along each edge of each block there are designated the numbers 1 to 7 which are the possible odd tricks that may be had in the playing of any one deal. In the other series of indicia 24 there appears other cooperative information in the scoring of the game. Thus in the upper block there is indicated the words "Not vulnerable", while in the next block there is designated "Vulnerable", both under the heading "Over tricks", while in the next blocks beneath the heading "Under tricks" there is designated the possible tricks which the bidder might fail to secure either when "Not vulnerable" or "Vulnerable" which would determine the score in penalties. Information additional to the two series above described may also appear on the face of one of the members to operate in a similar manner.

In the use of the device for computation, it may be assumed for illustrative purposes that the bid was five no trump; the pointer 25 would be placed at 5 along the side of the no trump block in the series of indicia 22. By this movement, the indicia 29 (partially shown) on the member 15 would be positioned in the window or slot 26 between the slits 13 and 14, and there would appear the number 175, 350 and 700, each above one of the three different conditions which also might have occurred during such bidding. For instance, if the bid had not been doubled the bidder would score 175 which would appear above this designation "Not doubled" in the window 26. Had the bidder been doubled, 350 would be the score, and had the declarer redoubled after such double, he would have scored 700 as appears above the designations "Redoubled" indicated clearly on the face of the device.

The use of the series of indicia 24 would be similar. For instance, had the declarer bid one when not vulnerable but had made six over-tricks, the pointer 27 would be positioned at 5 in the "Not vulnerable" block beneath "Over tricks", as illustrated in Figure 1, and there would appear in the window 28 adjoining the window 26 cooperative indicia 30 (partially illustrated) showing the figures of the score acquired by such over tricks. For instance, the score would be 250 if not doubled, 500 if doubled and 1000 if redoubled, each appearing above the appropriate wording to indicate these conditions. I also provide an indicated connection between cooperative information on the device by means of line 31 from the arrow or pointer 25 to an arrow or pointer 32 by which the information has the appearance of being joined together or cooperatively related.

This construction of the device is, in effect, a double form, and it would be necessary in some instances to move the slide twice, once for the bid trick score and again when over tricks are made or if other conditions arose. I may, however, as shown in the modification in Fig. 6, provide two separate slides 33 and 34 similarly arranged to that shown in Figures 1 to 5 above described, but separate and independent of each other for independent operation.

In other instances the outer member may consist of a front and back plate with window openings in each plate, and I have illustrated in Figures 7, 8 and 9 such construction wherein the slide member between the plates has indicia on both sides so that both sides of the card cooperate to give the required information. For instance, the front plate of one slide member is designated 35 and the back plate 36, each of which has one longitudinal slot 37 and 38 extending lengthwise thereof. The slide member 39 is woven through the strap portion 40 which positions it before a window 41 in the plate 35, while the plate 36 is provided with a window 42 that the information on the other side of this slide member 39 may appear therebefore. In this construction the slide is provided with fingers 43 and 44 similar to that shown in Figure 2, but one finger 43 will extend through the slot 37 while the other finger will extend through the slot 38 in the plate 36.

If the device is of the type used for advertising or illustrating the different uses which may be made of a cooking article such for instance as baking powder, the number of teaspoonfuls of baking powder required in the different recipes will appear in the indicia 45 on one face plate and pointer 46 may show four teaspoonfuls of baking powder will be used with certain quantities of the other ingredients such as flour, salt, and shortening appearing in the window 45 for making biscuits. At the same time the mixing directions and cooking directions for compositing the biscuits will appear as indicia 46 on the opposite side of the device in window 42. For instance in the use of biscuits the flour would be sifted dry, etc., while the oven would be set at 450° F. of heat and the biscuits would remain in the oven for ten minutes, or the cooperative indicia for making cakes and other foods might appear in a similar manner by moving the slide member of this device accordingly to different positions.

The face of the device at 49 or 50 is adapted to receive advertising or other data or pictorial representation to educate or instruct the user or enhance the appearance of the article as a whole.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. An indicating device comprising a pair of members, one member provided with a pair of spaced parallel slits therein and the other member passed through said slits to lie along one side of the portion between said slits, the portions of said other member passed through said slits comprising tabs providing pointers, said members being relatively movable, said first member being also provided with a second pair of spaced parallel slits to provide an opening in said member, and said other member being slidable through said second pair of slits, said second member having indicia thereon visible through said opening, and said first member having data thereon coordinated with said indicia by means of said pointers.

2. An indicating device comprising two members, one member being provided with openings having each an edge spaced from and parallel to the corresponding edge of the other opening, said edges defining a portion having spaced indicia thereon, a second member slidable along one face of the first member between said edges and having tabs projecting beyond said edges and provided with indicating means, the first member having a window and the second member having spaced indicia thereon successively exposed through said window and coordinated with the first indicia through said tabs by movement of the second member.

3. An indicating device comprising two members, one member being provided with an opening having an edge defining one side of a portion having spaced indicia thereon, a second member slidable along one face of the first member and having a tab carried by a marginal edge thereof for projecting beyond the edge of said opening and provided with indicating means, the first member having a window and the second member having spaced indicia thereon successively exposed through said window and coordinated with the first indicia through said tab by movement of the second member.

In testimony whereof I affix my signature.
ROBERT B. JONES.